United States Patent [19]

Kuriyama et al.

[11] Patent Number: 4,858,105
[45] Date of Patent: Aug. 15, 1989

[54] PIPELINED DATA PROCESSOR CAPABLE OF DECODING AND EXECUTING PLURAL INSTRUCTIONS IN PARALLEL

[75] Inventors: Kazunori Kuriyama; Yooichi Shintani, both of Kokubunji; Akira Yamaoka, Hachioji; Tohru Shonai, Kokubunji; Eiki Kamada, Hachioji; Kiyoshi Inoue, Tokyo, all of Japan

[73] Assignee: Hitachi, Ltd., Tokyo, Japan

[21] Appl. No.: 30,434

[22] Filed: Mar. 26, 1987

[30] Foreign Application Priority Data

Mar. 26, 1986 [JP]  Japan ................................ 61-65651

[51] Int. Cl.⁴ ............................................. G06F 15/00
[52] U.S. Cl. .................................... 364/200; 364/231.8; 364/261.3; 364/263
[58] Field of Search ... 364/200 MS File, 900 MS File

[56] References Cited

U.S. PATENT DOCUMENTS

| | | | |
|---|---|---|---|
| 3,771,138 | 11/1973 | Celtruda et al. | 364/200 |
| 4,399,507 | 8/1983 | Cosgrove, deceased et al. | 364/200 |
| 4,430,706 | 2/1984 | Sand | 364/200 |
| 4,454,578 | 6/1984 | Matsumoto et al. | 364/200 |
| 4,532,589 | 7/1985 | Shintani et al. | 364/200 |
| 4,594,655 | 6/1986 | Hao et al. | 364/900 |
| 4,594,659 | 6/1986 | Guenthner et al. | 364/200 |
| 4,613,935 | 9/1986 | Couleur | 364/200 |
| 4,626,989 | 12/1986 | Torii | 364/200 |
| 4,635,188 | 1/1987 | Williamson et al. | 364/200 |
| 4,675,806 | 6/1987 | Uchida | 364/200 |
| 4,685,058 | 8/1987 | Lee et al. | 364/200 |
| 4,739,470 | 4/1988 | Wada et al. | 364/200 |
| 4,760,520 | 7/1988 | Shintani et al. | 364/200 |
| 4,764,861 | 8/1988 | Sibuya | 364/200 |
| 4,775,927 | 10/1988 | Hester et al. | 364/200 |
| 4,794,517 | 12/1988 | Jones et al. | 364/200 |

Primary Examiner—Gareth D. Shaw
Assistant Examiner—Adolfo Ruiz
Attorney, Agent, or Firm—Antonelli, Terry & Wands

[57] ABSTRACT

A pipelined data processor comprises a circuit for storing two instructions in a pair of instruction registers, a circuit for detecting whether those instructions are a combination of an instruction requesting the use of an operation unit and an instruction requesting the use of another resource, and a circuit to control the execution of the instructions when the decision of the detection circuit is affirmative such that those instructions are executed by the operation unit and the resource in a plurality of stages.

3 Claims, 9 Drawing Sheets

| FIRST TWO BITS | INPUT 101 TO FIRST INSTRUCTION REGISTER | V1 | INPUT 102 TO SECOND INSTRUCTION REGISTER | V2 |
|---|---|---|---|---|
| 00 | 1 2 | 1 | 3 4 5 6 | 1 |
| 01 10 | 1 2 3 4 | 1 | 5 6 7 8 | 1 |
| 1 1 | 1 2 3 4 5 6 | 1 |  | 0 |

FIG. 3a 
← 4 BYTES →

FIG. 3b 
← 4 BYTES →

FIG. 3c 
← 6 BYTES →

PIPELINED DATA PROCESSOR CAPABLE OF DECODING AND EXECUTING PLURAL INSTRUCTIONS IN PARALLEL

BACKGROUND OF THE INVENTION

The present invention relates to a data processor for executing instructions in a pipelined and parallel fashion, and more particularly to a data processor which simultaneously decodes two instructions and executes them in a parallel and pipelined fashion.

In a prior art large scale general purpose computer, instructions are executed in a pipelined fashion to execute different instructions in an overlapped manner so that the execution speed of an instruction sequence is effectively increased. In order to improve speed, various techniques have been proposed. For example, in JP-A-60-17538, in order to execute an instruction which requests operations for two memory operands, two address adders are provided so that addresses of the two memory operands are simultaneously calculated. In JP-A-58-176751, two pipelined instruction execution units simultaneously (or parallelly) decode two instructions in one instruction sequence to parallelly execute them. In JP-A-59-32045 (or corresponding U.S. Pat. No. 4,626,989), in order to improve the above parallel decode technique, if the two instructions cannot be executed in parallel because the result of execution of the first instruction to be executed is used by the second instruction, then the second instruction is executed following the first instruction in the same pipelined instruction execution unit as that for the first instruction.

In the prior art parallel decode technique, each of the two pipelined instruction execution units needs an address generator, an operand read memory and an operation unit. When a data processor is constructed, the operation units and other units are provided in duplicate. Thus, investment in hardware is large, and the control configuration is complex. Since the operation unit comprises a plurality of units which perform various operations, the circuit scale thereof is large.

SUMMARY OF THE INVENTION

It is an object of the present invention to provide a data processor whose hardware scale is not large to compare with that of a pipelined instruction execution unit in a prior art data processor and which can decode a plurality of instructions in parallel.

The above object is achieved by means for applying two instructions to a pair of instruction registers, means for determining whether those instructions are a combination of an instruction which requires use of the operation unit and an instruction which requires use of another resource, and means for controlling execution of those instructions so that when the above determination is affirmative, the instructions are executed by using the operation unit and the other resource.

The instructions to be executed include an instruction which uses the operation unit as well as an instruction which uses a resource other than the operation unit. When the detection means detects that those two instructions have been extracted into the pair of registers, those two instructions are executed in parallel by the instruction execution means. As a result, the two instructions which use the operation unit and the other resource are executed in parallel. Thus, two instructions can be executed in parallel without providing two operation units.

DESCRIPTION OF THE PREFERRED EMBODIMENTS

Embodiments of the present invention will be explained with reference to the drawings.

Figure 1:
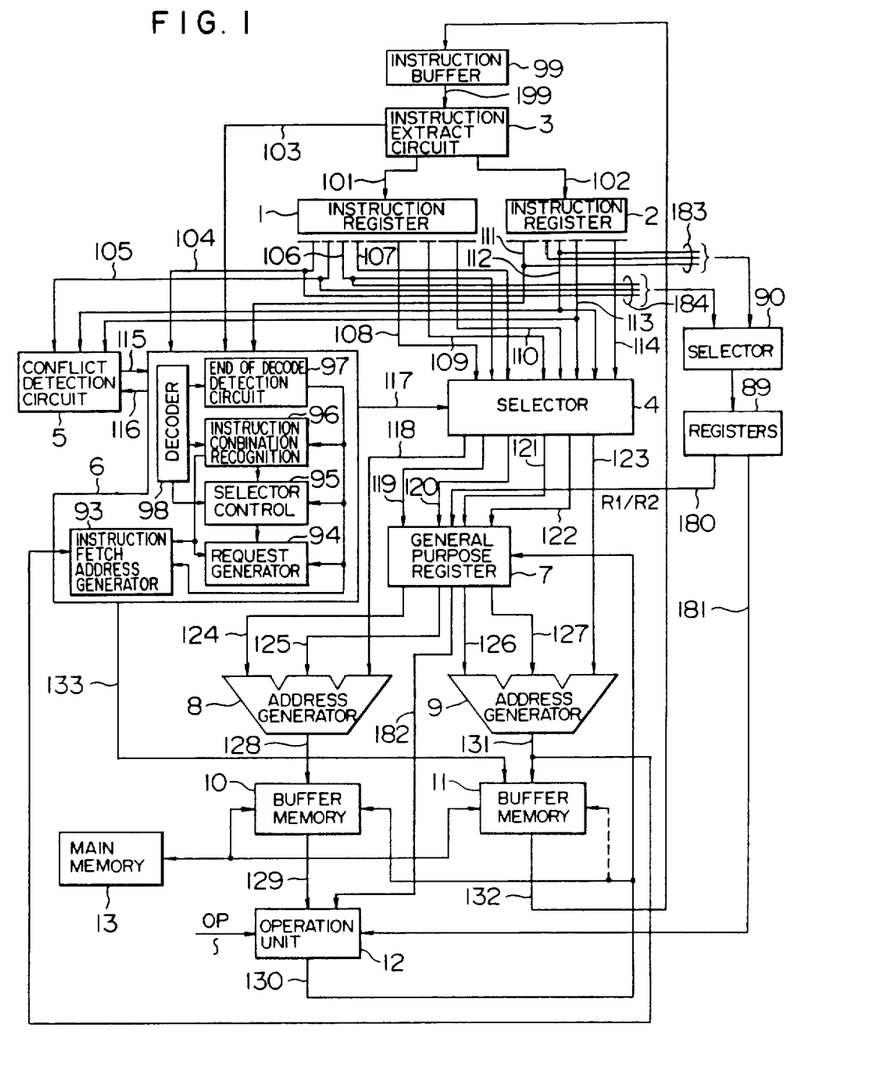
FIG. 1 shows an overall configuration of a processor which embodies the present invention.

FIG. 1 shows an overall configuration of a pipelined data processor which utilizes the present invention. The data processor comprises two instruction registers 1 and 2, an instruction extract circuit 3 for simultaneously extracting two instructions from an instruction buffer 99 and applying the instructions to those instruction registers 1 and 2, a selector 4 for selecting a general purpose register from a group of instruction registers and supplying the register number to a group of general purpose registers 7, two address generation circuits 8 and 9 for generating memory data addresses based on data read from the group of general purpose registers, a main memory 13, an operand buffer memory 10 and instruction buffer memory 11 accessed by addresses generated by the address generation circuits 8 and 9, an operation unit 12 for operating on an operand read from the buffer memory 10 and storing the result in the buffer memory 10 or the general purpose register 7, a decode control circuit 6 for decoding instructions in the instruction registers 1 and 2 to control the execution thereof, a conflict detection circuit 5, a selector 90 for selecting an instruction code and a register number of a register operand from instruction registers which hold instructions utilizing operation unit 12, among the instructions extracted and set in the instruction registers 1 and 2, and registers 89 for holding the selected instruction code and the selected register number until the start of operation in timed relation to each pipelined stage. The operation unit 12 comprises a plurality of operation circuits for performing arithmetic or logical operations required by the instructions executed by the processor. The control of operation is performed by supplying via a line 181 to the operation unit 12 an instruction code held in the registers 89 in timed relation to each pipelined stage.

The present processor sequentially executes the instructions in a pipelined fashion. The instruction buffer memory 11 is provided separately from the operand buffer memory 10 so that when the memory 10 is used for the execution of an instruction, a subsequent instruction is fetched in parallel.

The length of instruction executable by the present processor is 2, 4 or 6 bytes.

Figure 3A:
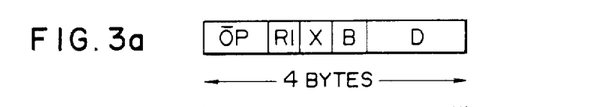

FIG. 3a shows an instruction format of a four-byte load instruction. The load instruction reads an operand data in the memory and stores it into the general purpose register. In FIG. 3a, OP represents an operation code, R1 represents a general purpose register number in which data read from the memory is to be stored, X and B represent two general purpose register (index register and base register) numbers for calculating an operand address in the memory, and D represents a displacement. The operand address is calculated by summing the contents of the index register (X), the contents of the base register (B) and the displacement (D).

Figure 3B:
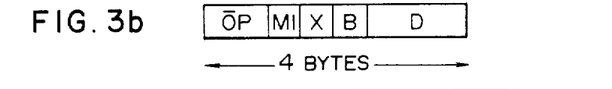

FIG. 3b shows an instruction format of a four-byte branch instruction. The branch instruction compares a mask value (M1) of the branch instruction and a condition code to determine whether to branch or not. A destination instruction address is determined by X, B and D of the instruction. The meanings of the bits of the instruction are identical to those of the load instruction, except for the mask value (M1).

Figure 3C:
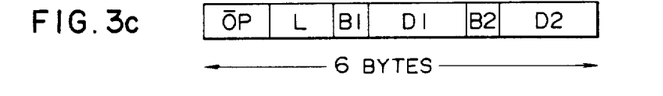

FIG. 3c shows a six-byte instruction. It holds two operands to be operated in the memory. To start the operation, an address of a first operand is calculated based on B1 and D1, then an address of a second operand is calculated based on B2 and D2 in order to read the operands.

An example of a two-byte instruction is not shown for simplification purpose.

Specific specifications of detail of the instructions are described in HITAC manual "M Series Processor (M/EA model)" (No. 8080-2-083 (1984) pp 12–14, 94, 179 and 195–198).

An outline of the operation of the present processor is now explained.

The instruction registers 1 and 2 have 6-byte and 4-byte lengths, respectively. Instructions (8 byte length) are sequentially fetched from the instruction buffer memory 11 through a signal line 132 and stored into the instruction buffer 99. The instruction extract circuit 3 extracts instructions (8-byte length), including the instruction to be next executed, from the instructions stored in the instruction buffer 99. When the instruction to be next executed is of 2-byte or 4-byte length, two instructions are included in the extracted instructions, and the instruction extract circuit 3 sets the instruction to be next executed (first instruction) and the following instruction (second instruction) into the instruction registers 1 and 2, respectively. When the instruction to be next executed is of 6-byte length, only the first instruction is set into the instruction register 1.

The operation when the first and second instructions are set into the first and second instruction registers is explained.

In the present invention, when there is no conflict of register between the first and second instructions or conflict between the resources (address generation circuits 8, 9 and buffer memories 10, 11), both instructions are simultaneously executed, and if there is any conflict, only the first instruction is preferentially executed. The necessary processing therefor is carried out by the conflict detection circuit 5 and an instruction combination recognition circuit 96. The former detects a conflict that a general purpose register in which the result of execution of the first instruction is to be written is designated by the second instruction as the index or base register. The latter detects a conflict that the first and second instructions use the same address generation circuit 8 or 9.

When the first instruction requires the fetching of the memory operand and the use of the operation unit and the second instruction reguires the fetching of the instruction and there is no register conflict between those instructions, those instructions can be executed in parallel in the present embodiment because the operand buffer 10 and the instruction buffer 11 are separately provided. The selector 4 selects an index register number, a base register number and a displacement specified by the first instruction, and reads the contents of the general purpose registers 7 corresponding to those register numbers. The address generation circuit 8 (which is a three-input adder) adds the contents of the registers and the displacement to generate an address for memory accessing. The generated address is sent to the buffer memory 10 and used to fetch the operand specified by the first instruction.

The selector 4 selects an index register number, a base register number and a displacement specified by the second instruction, and reads the contents of the general purpose registers 7 corresponding to those register numbers. The address generation circuit 9 (which is also a three-input adder) adds the contents of the general purpose registers and the displacement to generate an address for memory accessing. The generated address is sent to a buffer memory 11 and used to fetch the instruction specified by the second instruction.

When the first instruction requires the fetching of the instruction and the second instruction requires the fetching of the memory operand and the use of the operation unit, those instructions are executed in parallel. The address generation circuit 8 and the buffer memory 10 are used for the instruction 2, and the address generation circuit 9 and the buffer memory 11 are used for the instruction 1.

When both the first instruction and the second instruction require the fetching of the memory operands, the two instructions cannot be executed in parallel because there is only one operand buffer 10 and only one operation unit 12 in the present embodiment, and only the first instruction is executed. The address generation circuit 8 and the buffer memory 10 are used.

When both the first and second instructions require the fetching of the instructions, only the first instruction is executed. The address generation circuit 9 and the buffer memory 11 are used for the instruction 1.

When only the instruction 1 is executed, the instruction extract circuit 3 extracts a group of instructions (8-byte length), which include the instruction 2 as an instruction to be next executed, from the instruction buffer 99, and the instruction 2 is set into the instruction register 1 and the instruction to be next executed is set into the instruction register 2. Thus, the instruction 2 is executed one cycle behind the instruction 1.

The instruction code and register number of an instruction allowed to execute are selected by the selector 90 and delivered to the registers 89. The registers 89 comprise a plurality of registers connected in series. The contents of each register is successively delivered to the next register. An instruction is executed by a plurality of pipelined stages, with each stage corresponding to each of the registers. The contents of each register is used to control the corresponding stage.

When an instruction allowed to execute utilizes data in the general purpose registers 7 as an operation operand, the register numbers R1 and R2 specified by the instruction are delivered via a line 180 to the general purpose registers 7. An operand is read out on a line 182 and delivered to the operation unit 12.

The decode control circuit 6 includes a selector control circuit 95 which controls the selector 4, a request generation circuit 94 which issues a fetch request to the buffer memory 10 or 11, and an end of decode detection circuit 97 which controls the entire circuit.

Figure 2A:
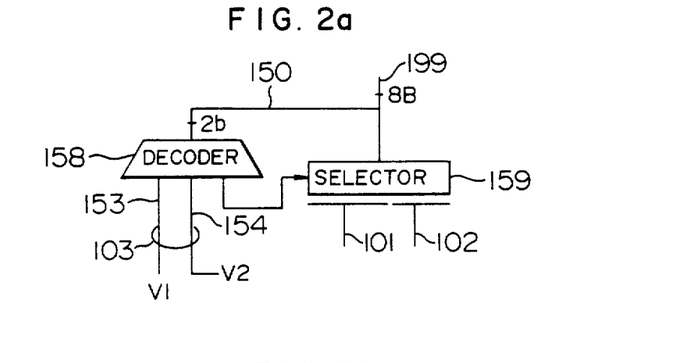
FIGS. 2a and 2b illustrate in detail instruction extraction circuit 3 of FIG. 1, FIGS. 3a, 3b and 3c show various instruction formats.
Figure 2B:
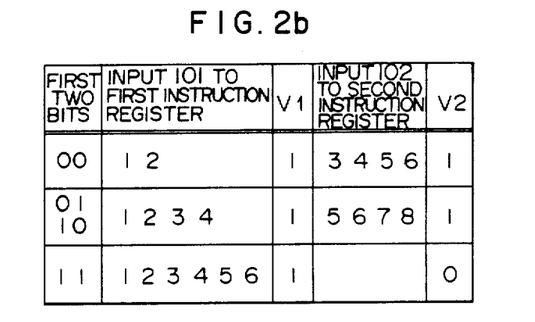

Details of the processor of FIG. 1 are now explained. Details of the instruction extract circuit 3 are shown in FIGS. 2a and 2b, in which FIG. 2a shows a hardware configuration and FIG. 2b illustrates operation thereof. A signal line 199 denotes 8-byte instructions fetched from the instruction buffer 99, and a signal line 150 denotes the first two bits of the eight bytes. The instructions handled in the present processor have an instruction format of the HITAC-M Series computer, and the length of the instruction is specified by the first two bits of the instruction. When the first two bits of the instruction are "00", the instruction is of 2-byte length, when they are "11", it is of 6-byte length, and when they are neither "00" nor "11", it is of 4-byte length. (Detail of the M Series instruction specification is described in HITAC manual "M Series Processor (M/EA mode)" (No. 8080-2-083 (1984) pp 63-64).) The decoder 158 decodes the first two bits to control the selector 159, and produces first and second valid signals V1 and V2 indicating whether valid instructions have been sent to the first and second instruction registers 1 and 2. For example, when the first two bits of the instruction are "00", the instruction is of 2-byte length, and the selector 159 applies the first and second bytes of the eight bytes on the signal line 199 to the signal line 101 and sends them to the first instruction register. On the other hand, in order to apply the instruction next to the instruction applied to the signal line 101 from the eight bytes on the signal line 199, the selector 159 applys the third to sixth (four) bytes to the signal line 102 and sends them to the second instruction register. When the first two bits of the instruction indicates the four-byte length of the instruction, the bytes 1-4 on the signal line 199 are applied onto the first instruction register 1, and the next instruction, that is, the bytes 5-8 are applied from the signal line 199 into the second instruction register 2. When the first instruction of 6-byte length, the bytes 1-6 on the signal line 199 are extracted and sent to the first instruction register 1, and nothing is sent to the second instruction register 2. Namely, when the 6-byte length instruction is applied into the first instruction register, the immediately following instruction is not executed in parallel.

The decoder generates "1" on V1 and V2 when the first two bits on the line 199 is "00", "01" or "10", and generates "0" on V2 when the first two bits are "11" to indicate that a valid instruction has not been sent to the second instruction register 2. It should be noted that when the instruction set in the second instruction register 2 is of 6-byte length, all bytes are not aligned even if the signal V2 is sent on the line 154.

The instructions fetched from the instruction buffer 99 are applied by the instruction extract circuit 3 to the instruction registers 1 and 2 as the first and second instructions. Let us assume that a load instruction is applied into the instruction register 1 and a branch instruction is applied to the instruction register 2.

When the load instruction and the branch instruction are applied to the instruction registers 1 and 2, respectively, the load instruction refers the operand buffer memory 10 to fetch the operand, and the branch instruction refers the instruction buffer memory 11 to fetch a branch-to instruction. This operation is explained below.

When the instructions are applied to the instruction registers 1 and 2, the operation codes of the first and second instructions are decoded by the decoder 98 in the decode control circuit 6, the possibility of parallel execution of the two instructions is checked by the instruction combination recognition circuit 96, a request signal to the memory is generated by the request generation circuit 94, and a control signal to the selector 4 is generated by the selector control circuit 95. When the end of instruction decoding is detected by the end of decode detection circuit 97, the address in the instruction fetch address generation circuit 93 is incremented by the instruction length to fetch the next instruction.

Figure 4:
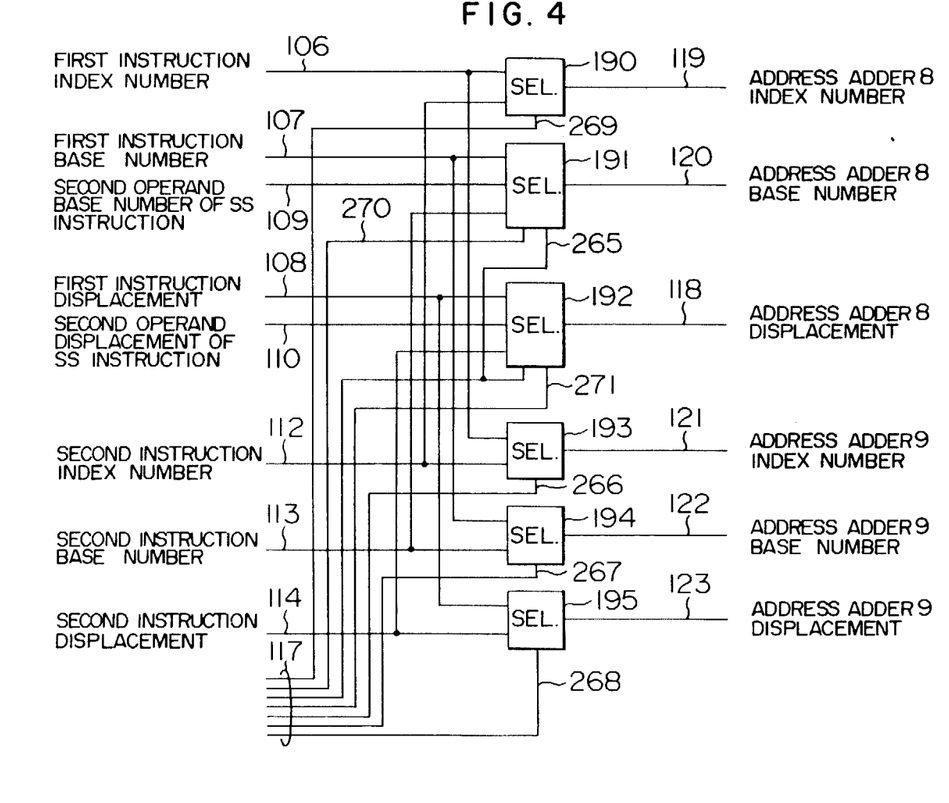
FIG. 4 shows in detail selector 4 of FIG. 1 for selecting a register number used to generate an address.

Details of the selector 4 are shown in FIG. 4. Numerals 190, 193-195 denote two-input, one-output selectors, and numerals 191 and 192 denote three-input, one-output selectors. The selectors 190-195 select the register numbers of the index register and the base register or the displacements and supply them to the general purpose register 7 and the address generation circuits 8 and 9. The select operation is controlled by the signal line 117 as follows. For example, the index register numbers of the first instruction and the second instruction are supplied to the selector 190. When the control line 269 is not set, the index register number 106 of the first instruction is selected and supplied to the signal line 119. The data read by using this register number is supplied to the address generation circuit 8 through the signal line 124. If the decode control circuit 6 determines that the address calculation of the second instruction is to be conducted by the address generation circuit 8, the signal line 269 is set, and the index register number 112 of the second instruction is selected and supplied to the signal line 119.

In the selector 191, when the control signals 270 and 265 are not set, the base register number 107 of the first instruction is selected and supplied to the signal line 120, and if the decode control circuit 6 determines that the address calculation of the second instruction is to be conducted by the address generation circuit 8, the control line 270 is set and the base register number 113 of the second instruction is selected. If the decode control circuit 6 determines that the address calculation of the 6-byte length (SS format) second instruction is to be conducted, the signal line 109 is selected. Since the 6-byte instruction has two memory operands, two cycles of memory reference are required in the present processor, and the signal line 109 is selected for the memory reference of the second operand. The other selectors are controlled in a similar manner. The selector 192 selects the displacement 114 if the signal line 271 is set, and selects the displacement 110 if the signal line 265 is set. The selector 193 selects the index register number 112 if the signal line 266 is set, the selector 194 selects the base register number 113 if the signal line 267 is set, and the selector 195 selects the displacement 114 if the signal line 268 is set.

The register numbers on the signal lines 119-122 of the outputs of the selector 4 are supplied to the general purpose register 7 and used for fetching data. The content of the register specified by the signal line 119 is read onto the signal line 124. Similarly, the contents of the registers specified by the signal lines 120, 121 and 122 are read onto the signal lines 125, 126 and 127, respectively. It is now assumed that the load instruction is set in the instruction register 1 and the branch instruction is set in the instruction register 2. Thus, the contents of the index register specified by the load instruction are read onto the signal line 124, the contents of the base register specified by the load instruction are read onto the signal line 125, the contents of the index register specified by the branch instruction are read onto the signal line 126, and the contents of the base register specified by the branch instruction are read onto the signal line 127, through the selector 4 and the general purpose register 7. None of signal lines 117 is not set at this time. The address generation circuit 8 receives the data on the signal lines 124 and 125 and the displacement on the signal line 118 and adds them, and transfers the resulting address to the operand buffer memory 10 through the signal line 128, transfers the operand data fetched therefrom to the signal line 129 and the operation unit 12 and to the general purpose register 7 through the signal line 130 without any operation in the operation unit 12 and stores it in the general purpose register specified by the first instruction. On the other hand, the address generation circuit 9 receives the data on the signal lines 126 and 127 and the displacement on the signal line 123 and adds them to calculate a branch-to address for the branch instruction. The sum is transferred to the instruction buffer memory 11 through the signal line 131 to fetch the branch-to instruction. The branch-to instruction is required when the branch instruction follows the branch. In this case, the branch-to instruction fetched from the buffer memory 11 is supplied to the instruction buffer 99 through the signal line 132 and extracted into the instruction registers 1 and 2.

The decode control circuit 6 comprises the instruction combination recognition circuit 96 which controls the selector 4 depending on the combination of the instructions applied to the instruction registers 1 and 2, the selector control circuit 95, the request generation circuit 94 for issuing a memory reference request to the buffer memory 10 or 11, the end of decode detection circuit 97 for detecting the end of decoding of the instruction, and the instruction fetch address generation circuit 93 for updating the instruction fetch address.

Figure 5:
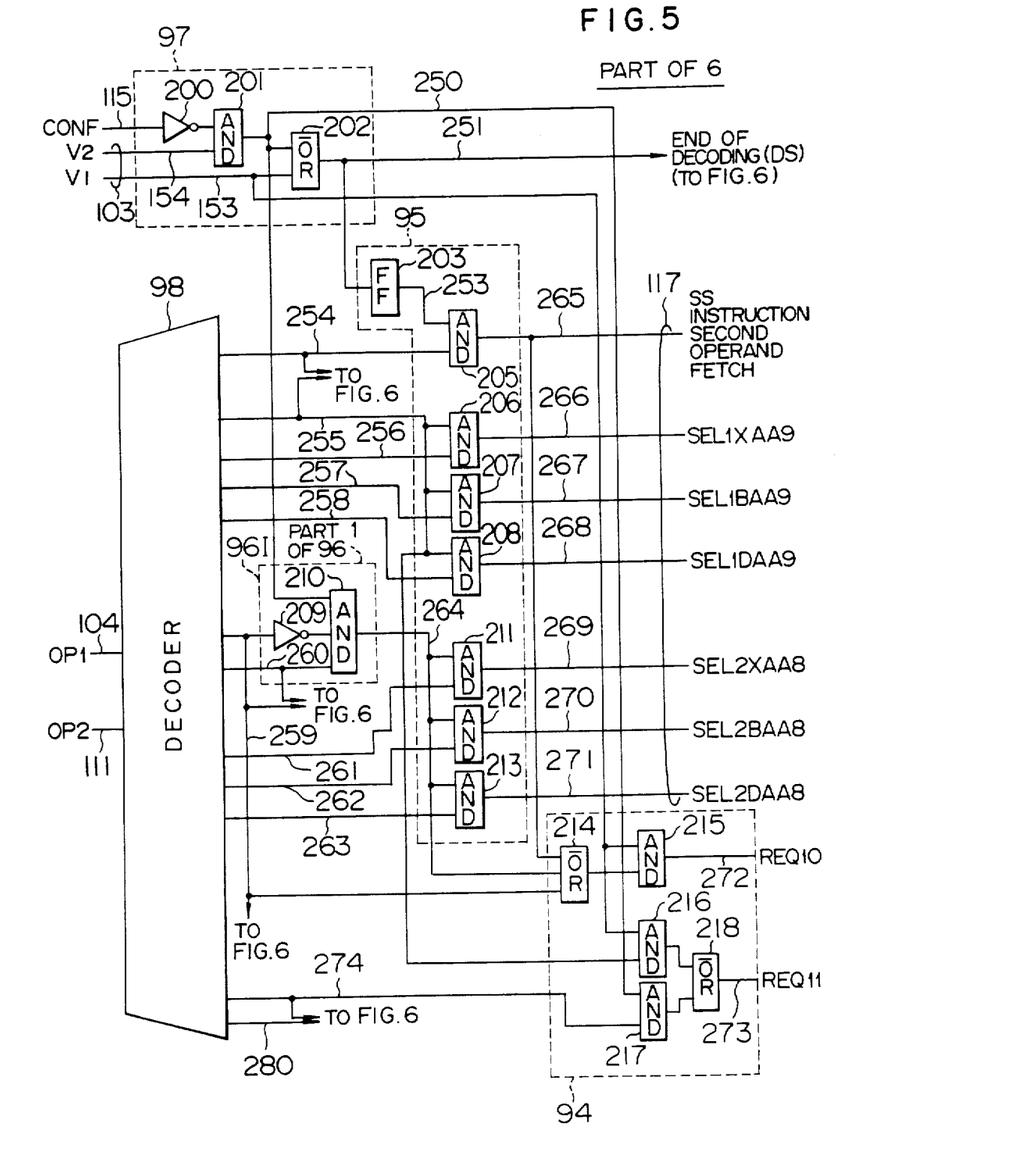
FIG. 5 shows a circuit for generating a select signal and a memory read request, of decode control circuit 6 of FIG. 1.
Figure 6:
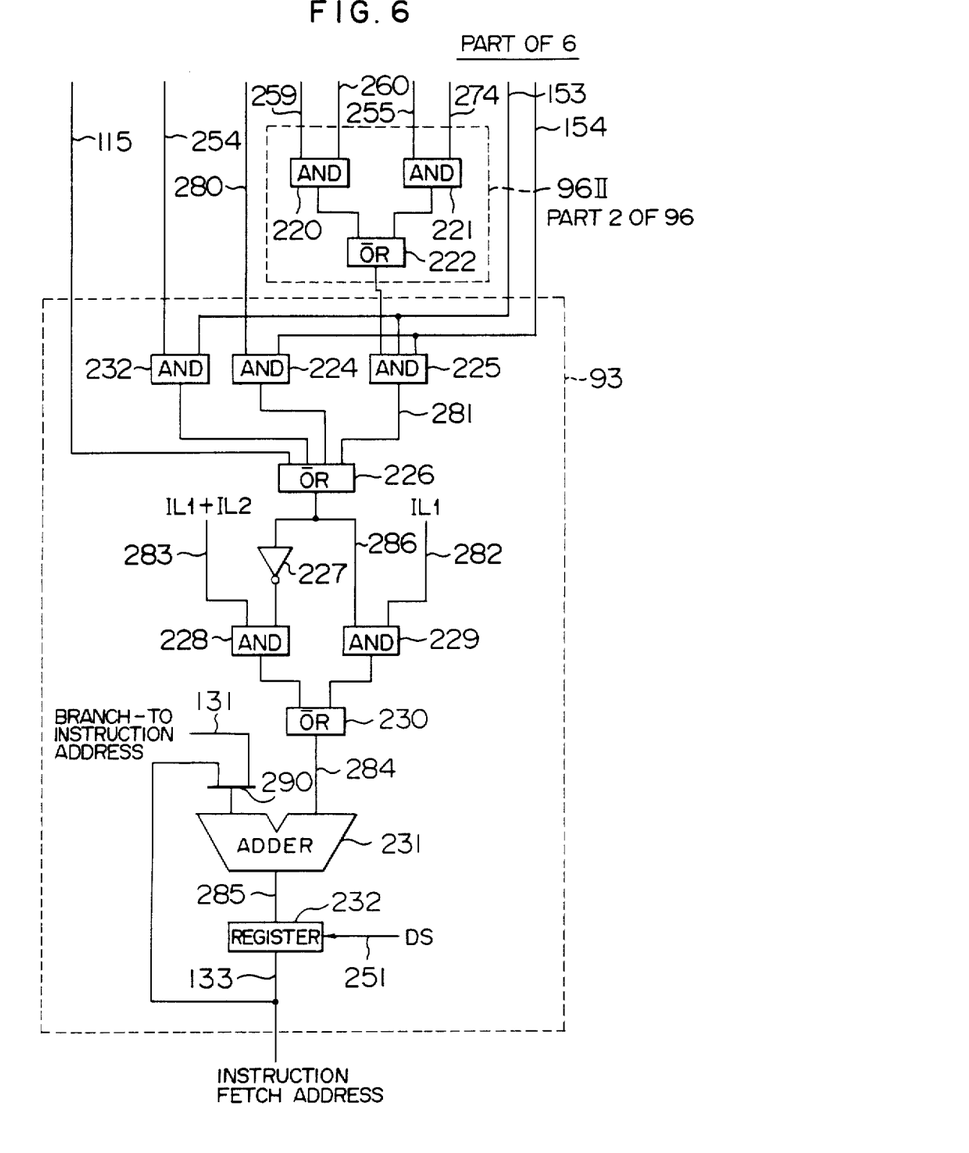
FIG. 6 shows in detail an instruction read adder in decode control circuit 6 of FIG. 1.

FIGS. 5 and 6 show details of the decode control circuit 6. In FIG. 5, numeral 98 denotes a decoder which decodes the operation codes OP1 and OP2 of the first and second isntructions and applies the results to the signal lines 254–263. Numeral 203 denotes a flip-flop which has the function of delaying the input signal one cycle. Numerals 200 and 209 denote inverter gates which logically invert the input signals. The other components OR gates.

A signal DS on a signal line 251 indicates the end of decoding of the instruction. It is set when the signal V1, indicating that the first instruction, is valid is set on the signal line 153, or when the signal V2, indicating that the second instruction is valid, is set on the signal line 154 and a conflict signal CONF is not set on the signal line 115. This circuit utilizes the fact that if the second instruction is valid, the first instruction is always valid. When the coding of the first and second instructions is completed by the signal line 251, the instruction fetch address is incremented by an instruction fetch address generation circuit 93 (FIG. 6) so that the succeeding instructions are extracted into the instruction registers 1 and 2. In FIG. 6, a signal line 133 denotes a fetch address of the instruction to be fetched from the instruction buffer memory 11. When the decoding of the instruction is completed, the address of the previous instruction in the register 232 is incremented by adder 231 by the instruction length of the decoded instruction on line 284, and the result is held in the register 232 for use in fetching the next instruction from the buffer memory 11. The end of instruction decode signal line 251 of FIG. 5 is used to set the register 232.

The instruction length of the decoded instruction is supplied to the signal line 284. The signal line 259 is set when the first instruction uses the address generation circuit 8, and the signal line 260 is set when the second instruction uses the address generation circuit 8. The signal line 255 is set when the first instruction uses the address generation circuit 9, and the signal line 274 is set when the second instruction uses the address generation circuit 9. The signal lines 153 and 154 indicate the validity of the first and second instructions, respectively. The signal line 281 is set when the first and second instructions cannot be simultaneously decoded by the conflict of the address generation circuits 8 and 9. The signal line 254 is set when the first instruction is of 6-byte length, and the signal line 280 is set when the second instruction is of 6-byte length. As described above, when the first instruction is of 6-byte length the second instruction is not decoded, and when the second instruction is of 6-byte length, the second instruction is not decoded in parallel. As a result, the signal line 286 is set only when the decoding of only the first instruction is completed and the succeeding instruction is to be decoded in the next decode cycle. Thus, in this case, the instruction fetch address is incremented by the instruction length IL1 of the first instruction. When the signal line 286 is not set, the first and second instructions can be decoded in parallel. In this case, the address is incremented by the sum of the instruction length of the first instruction and the instruction length of the second instruction (IL1+IL2). Thus, the instruction length IL1 of the first instruction is set in the signal line 282, and the sum IL1+IL2 of the instruction length IL1 of the first instruction and the instruction length IL2 of the second instruction is set in the signal line 283 so that the instruction length of the decoded instruction is set in the signal line 284 and the next instruction fetch address is produced on the line 285 by adding the original instruction address in the register 32 and the instruction length on the line 284 by the adder 231. The next instruction fetch address is set in the register 232.

If the decoded instruction is the branch instruction, instead of the original instruction address in the register 232, the branch-to instruction address 131, generated by the address generation circuit 9 of FIG. 1, is selected by the selector 290 and added to the instruction length on the line 284.

In FIG. 5, the signal line 265 is set when the first instruction is of 6-byte length and the second operand of the instruction is to be fetched. It is set in the second cycle from the extraction of the 6-byte instruction into the instruction register 1. The signal line 253 indicates a one-cycle delay of the end of decode signal, and the signal line 254 is set when the first instruction is of 6-byte length and meets the condition for the signal line 265.

The signal line SEL1XAA9 266 is set when the first instruction uses the address generation circuit 9 and requires reading of the index register. The signal line 255 is set when the first instruction uses the address generation circuit 9, and the signal line 256 is set when the first instruction requires reading of the index register. Since the signal line 257 is set when the first instruction requires reading of the base register, the signal line SEL1BAA9 267 is set when the first instruction uses the address generation circuit 9 and requires reading of the base register. Similarly, the signal line SEL1DAA9 268 is set when the first instruction uses the address generation circuit 9 and requires addition of the displacement.

Since the signal line 261 is set when the second instruction requires reading of the index register, the signal line SEL2XAA8 269 is set when the second instruction uses the address generation circuit 8 and requires reading of the index register. Similarly, since the signal line 262 is set when the second instruction requires reading of the base register, the signal line SEL2BAA8 270 is set when the second instruction uses the address generation circuit 8 and requires reading of the base register. Since the signal line 263 is set when the second instruction requires the addition of the displacement, the signal line SEL2DAA8 271 is set when the second instruction uses the address generation circuit 8 and requires the addition of the displacement. The address calculation by the second instruction cannot always be performed and the possibility of execution is examined by the instruction combination recognition circuit 96. In this circuit, the signal line 259 is set when the first instruction uses the address generation circuit 8, and the signal line 260 is set when the first instruction uses the address generation circuit 8. Thus, the signal 264 indicates the condition to permit the use of the address generation circuit 8 by the second instruction. The signal lines 265–271 have been explained in connection with FIG. 4.

As seen from the above description, the signal line 259 is set when the first instruction uses the address generation circuit 8, the signal line 264 is set when the second instruction uses the address generation circuit 8, and the signal line 265 is set when the first instruction is of 6-byte length and the address calculation of the second operand of the instruction is to be carried out by the address generation circuit 8. The operand fetch request REQ 10 on line 272 for the operand memory 10 may be set in the above three cases. On the other hand, since the signal line 255 is set when the first instruction uses the address generation circuit 9 and the signal line 274 is set when the second instruction uses the address generation circuit 9, the instruction fetch request REQ 11 to the instruction buffer memory 11 may be set in the above two cases.

In this manner, the decode control circuit 6 decodes the operation codes of the first and second instructions to effect control necessary for the memory reference of the first instruction (load instruction), that is, issues input data select control of the address generation circuit 8 and memory read request to the buffer memory 10, and effects control necessary for memory reference of the second instruction (branch instruction), that is, issues input data select control of the address generation circuit 9 and memory read request to the buffer memory 11. It also detects the end of decoding of the first and second instructions to exactly calculate the addresses of the instructions to be next extracted into the instruction registers 1 and 2 by using the instruction address adder 231 so that the instructions are sequentially fetched.

In the above description, it has been assumed that the load instruction and the branch instruction extracted into the instruction registers 1 and 2 can always refer the memory in parallel and the decoded in parallel. However, in the following case, the second instruction (branch instruction) cannot refer to the memory in parallel with the load instruction. Namely, when the register number specified by the index register or the base register of the branch instruction is specified by an R1 part of the first instruction (load instruction) for updating the content thereof, it is necessary to generate the branch-to instruction address of the second instruction (branch instruction) after the operand is fetched from the buffer memory 10 by the first instruction (load instruction).

Figure 7:
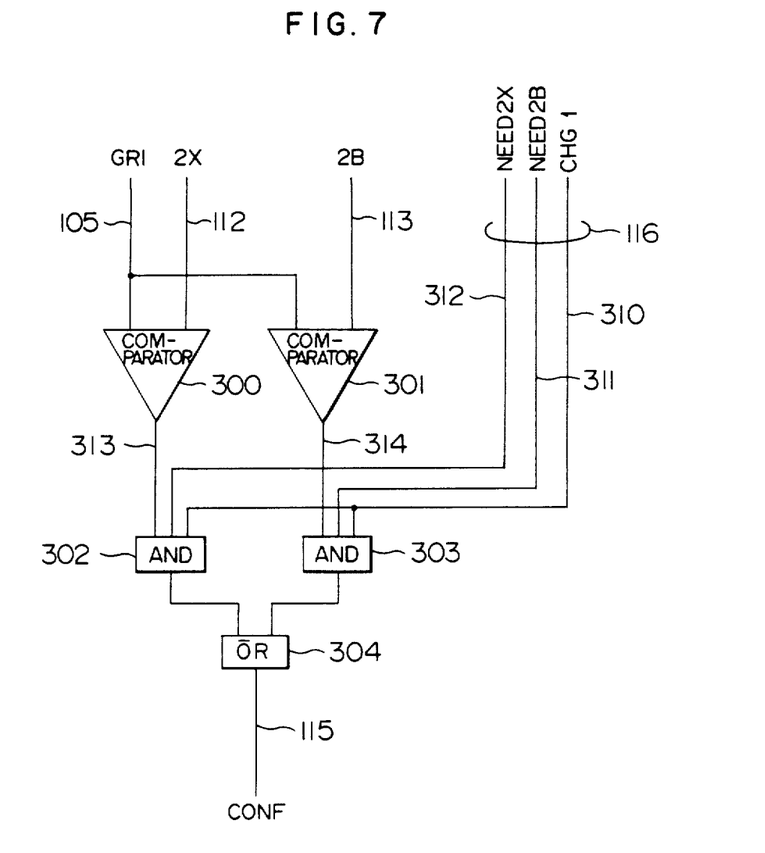
FIG. 7 shows in detail conflict detection circuit 5 of FIG. 1, FIGS. 8a, 8b, 8c and 8d show an instruction execution flow in the present invention.

Details of the conflict detection circuit 5, which detect whether the first instruction changes the register used in the address generation of the second instruction when the instructions are applied to the instruction registers 1 and 2, are shown in FIG. 7. The signal line 105 indicates a register number GR1 to be updated by the first instruction, and the signal lines 112 and 113 indicate the index register number 2X and the base register number 2B used in the address generation by the second instruction. They are compared by comparators 300 and 301, and if they match, the signal lines 313 and 314 are set. Those signals are logically ANDed by gates 302 and 303 with the signal CHG1 on line 310 which indicates that the first instruction changes the content of the general purpose register specified by R1 and the signal NEED2X on line 312 which indicates that the second instruction requires the readout of the index register or the signal NEED2B on line 311 which indicates that the second instruction requires the readout of the base register. If the register number to be changed by the first instruction is equal to the register number to be read by the second instruction, the signal line CONF 115 is set.

The signal line 115 is connected to the decode control circuit 6. In FIG. 5, if the signal line 115 is set, the AND gate 201 is not conditioned, and the AND gates 210 and 217, which use the output signal 250 of the AND gate 201, are also not conditioned, so that the read request to the memory by the second instruction is suppressed. In FIG. 6, when the signal line 115 is set, the output 286 of the OR gate 226 is set, and the instruction length 282 of the first instruction is selected and it is supplied to the next instruction fetch address calculation adder 231 through the signal line 284 as an increment.

If the conflict detection circuit 5 detects that the register to be updated by the first instruction is to be read as the index or base register of the second instruction, the end of decode detection circuit 99 controls only the execution of the first instruction, and the second instruction is again extracted into the instruction register 1 by the instruction fetch address generation circuit after the first instruction has been decoded. It is necessary to suppress the decoding of the branch instruction until the preceding load instruction operand is fetched. This may be done by conventional logic and is not explained here.

The operation performed when the branch instruction and the load instruction are extracted into the instruction register 1 and the instruction register 2, respectively, is now explained. In FIG. 5, since the first instruction uses the address generation circuit 9, the signal line 255 is set, and the select signals 266–268 are set. Since the second instruction uses the address generation circuit 8, the signal line 260 is set, and the signal line 259 is not set. Accordingly, the signal line 264 is set, and the select signals 269–271 are set. As a result, the data 112–114 of the second instruction (load instruction) are selected by the selectors 190–192 of FIG. 4 and supplied to the signal lines 118–120. On the other hand, the data 106–108 of the first instruction (branch instruction) are selected by the selectors 193–195 and supplied to the signal lines 121–123. In this manner, the address generation circuit 8 calculates the operand address of the second instruction (load instruction), and the address generation circuit 9 calculates the branch-to address of the first instruction (branch instruction).

A read request 272 to the buffer memory 10 and a read request to the buffer memory 11 are set, and the memories are referred by using the addresses calculated above.

In FIG. 6, since none of the signal lines 115, 254, 255, 259, 260, 274 and 280 is set, the output of the OR gate 226 is not set, and the sum (IL1+IL2) of the first instruction length IL1 and the second instruction length IL2 is selected by the AND gate 228 and supplied to the adder 231. As a result, the instruction fetch address is incremented by the length of the two instructions, the branch instruction and the load instruction.

In this manner, whichever of the instruction registers 1 and 2 the instruction which uses the address generation circuit 8 or 9 is extracted to, the exact corresponding address generation circuit is selected, and the address calculation and the memory reference are performed.

As described above, when the two instructions which do not cause conflict between the address generation circuits 8 and 9 are applied to the instruction registers 1 and 2, only the conflict between the registers need be detected. However, depending on the combination of the two instructions, it is necessary to suppress parallel decoding of the two instructions in the address generation stage. This is a feature of the present invention and will be specifically described below.

An operation performed when load instructions are applied to both the instruction registers 1 and 2 is first explained, and then an operation performed when branch instructions are applied to both the instruction registers 1 and 2 is explained.

When the load instructions are applied to the instruction registers 1 and 2, the instruction combination recognition circuit 96 of FIG. 5 sets the signal line 259 to indicate that the first instruction uses the address generation circuit 8, and the output signal of the inverter gate 209 assumes logical "0". Accordingly, even if the signal 260 is set to indicate that the second instruction uses the address generation circuit 8, the AND gate 210 is not conditioned, and a use permission signal 264 for the use of the address adder 8 by the second instruction is not set. Accordingly, the output signals of the AND gates 211–213 are not set. Therefore, in the selectors 190–192 of FIG. 4, the data lines 106–108 of the first instruction are selected and supplied to the signal lines 118–120. As a result, the address generation circuit 8 can calculate the operand address of the load instruction in the instruction register 1. In FIG. 5, when the signal line 259 is set, the operand fetch request signal 272 to the buffer memory 10 is set, and the operand is fetched from the buffer memory 10. On the other hand, since none of the first and second instructions uses the address generation circuit 9, the signal lines 255 and 274 are not set, and the signal line 273 is not set. As a result, the buffer memory 11 is not read. In the instruction combination recognition circuit 96II of FIG. 6, since the signal lines 259 and 260, which indicate that the first and second instructions use the address generation circuit 8, are set, the output of the AND gate 220 is set, and the signal lines 286 is set through the signal line 281. As a result, the instruction length IL1 282 of the first instruction is selected and supplied to the adder 231. The instruction fetch address is incremented by the length of the load instruction in the instruction register 1, and the load instruction in the second instruction register 2 is extracted into the instruction register 1.

In this manner, when the load instructions are extracted into the instruction registers 1 and 2, the instruction combination recognition circuit 96I and 96II operate such that only the load instruction in the instruction register 1 is executed, and the load instruction in the instruction register 2 is executed one cycle later.

The operation performed when the branch instructions are applied to the instruction registers 1 and 2 is now explained. Since both the first and second instructions use the address generation circuit 9, the decode signals 255 and 274 of FIG. 5 are set. Since the branch instruction does not use the address generation circuit 8, the instruction combination recognition circuit 96I is not activated. As a result, the select signals 266–268 and the read request 273 to the buffer memory 11 are set. In the selectors 193–195 of FIG. 4, the data 106–108 of the first instruction (branch instruction) are selected and supplied to the signal lines 121–123. Thus, the branch-to instruction address of the first instruction is calculated in the address generation circuit 9. Since the signal line 273 has been set, the branch instruction can be fetched from the buffer memory 11. Since none of the first and second instructions uses the address generation circuit 8, the read request 272 to the buffer memory 10 is not set. In the instruction combination recognition circuit 96II of FIG. 6, since the AND gate 221 is conditioned, the instruction length 282 of the first instruction is selected and supplied to the adder 231. The instruction fetch address is incremented by the length of the branch instruction in the instruction register 1, and the branch instruction in the instruction register 2 is again applied to the instruction register 1.

As explained above, in the processor shown in FIG. 1, the two instructions which are consecutive in the main memory 13 are fetched from the buffer memory 11 in parallel and extracted into the instruction registers 1 and 2. The conflict detection circuit 5 detects the conflict between the registers that the general purpose register to be updated by the first instruction is to be read by the second instruction during the address generation, and the instruction combination recognition circuit 96 detects the conflict that the first and second instructions use the same address generation circuit or buffer memory. In this manner, the parallel execution of the first and second instructions is enabled, and the execution time is shortened.

An effect of the high speed operation in the present processor is explained with reference to FIG. 8, in which D, A, L, E and P denote instruction execution cycles in a pipeline system. In the cycle D, an instruction is decoded and an address is generated, in the cycle A, the buffer memory is interrogated, in the cycle L, the data read from the memory is transferred, in the cycle E, the data is operated on, and in the cycle P, the result is stored. A branch instruction does not require the operation in the cycle E and the storing in the cycle P.

Figure 8A:
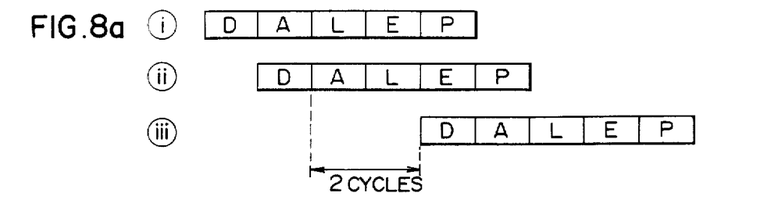
Figure 8B:
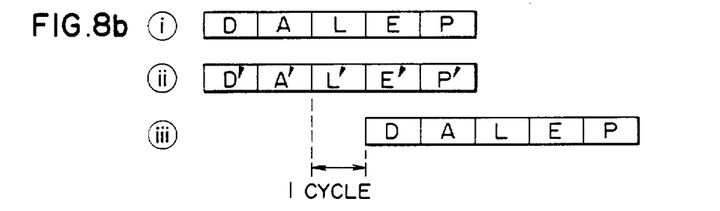

In FIGS. 8a and 8b, (i) is a load instruction, (ii) is a branch instruction, and (iii) is a branch-to instruction of the branch instruction. In a prior art processor in which plural instructions are not decoded in parallel, the load instruction and the branch instruction are decoded serially in each cycle as shown in FIG. 8a. Thus, the decoding of the branch-to instruction can be started two cycles after the end of the decoding (cycle D) of the branch instruction (ii). On the other hand, in the present invention, since the load instruction and the branch instruction can be decoded in parallel, the branch instruction (ii) can be decoded in parallel with the load instruction (i) as shown in FIG. 8b, and the operand fetching of the load instruction and the fetching of the branch-to instruction of the branch instruction can be executed in parallel. Thus, the decoding of the branch-to instruction is attained one cycle earlier than that in FIG. 8a. In FIG. 8b, the execution cycles for the branch instruction (ii) are designated by D', A', L', E' and P'. In FIG. 8b, the operation cycle E of the load instruction and the operation cycle E' of the branch instruction are performed in parallel, but only one operation unit is required because the branch instruction does not need operation.

Figure 8C:
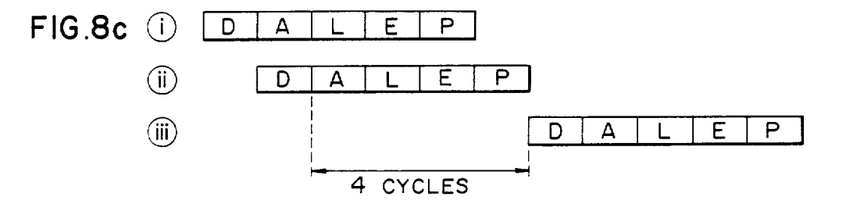
Figure 8D:
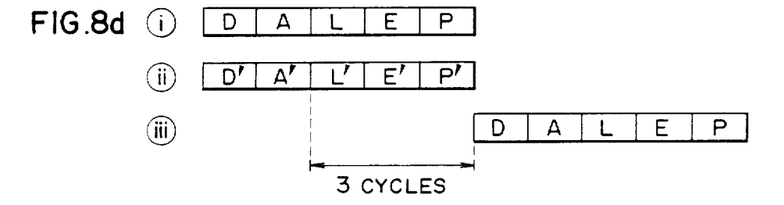

In FIGS. 8c and 8d, (i) is a branch instruction, (ii) is an add instruction, and (iii) is an instruction which uses in the address calculation a general purpose register modified by the add instruction. The instruction format of the add instruction is same as that shown in FIG. 3a. Let us assume that the branch instruction (i) fails to branch. In the prior art processor in which plural instructions are not decoded in parallel, the decoding of the instruction (iii) is started after the operand of the add instruction (ii) on the buffer memory 10 has been fetched and the operation result has been stored, as shown in FIG. 8c. Thus, there is a 4-cycle overhead. On the other hand, in the present invention, since the branch instruction (i) and the add instruction (ii) can be decoded in parallel as shown in FIG. 8d, the overhead to the instruction (iii) can be shortened to three cycles.

As seen from FIGS. 8a–8d, the instruction execution speed is increased depending only on the combination of the instructions extracted into the instruction registers 1 and 2 in parallel, without regard to the sequence of the two instructions. In addition, there is no need to increase the hardware of the operation unit.

Figure 9:
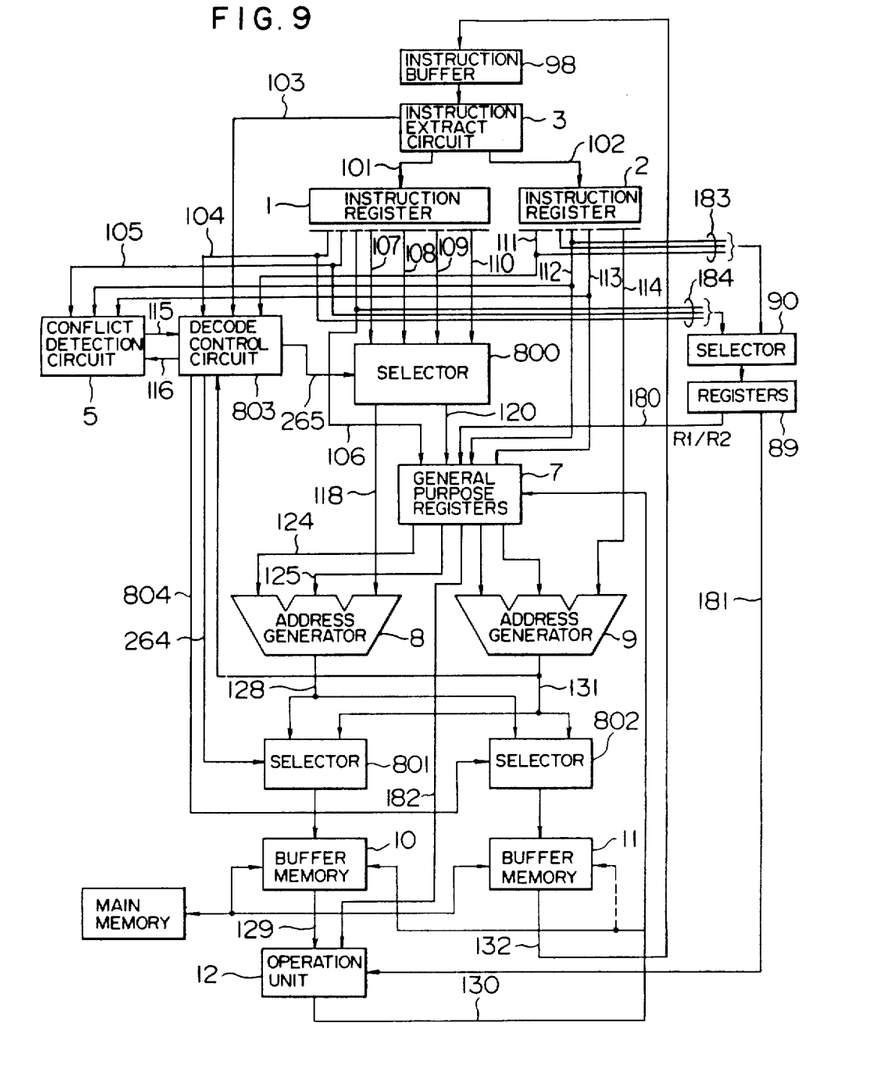
FIG. 9 shows an overall configuration of another processor which embodies the present invention.

In order to decode the instructions in parallel only by the combination of the instructions, it is necessary that the instruction registers 1 and 2 and the address generation circuits 8 and 9 or the buffer memories 10 and 11 can be interconnected in any way. In the processor shown in FIG. 1, the selector 4 attains this function. The address generation circuits 8 and 9 and the buffer memories 10 and 11 are correlated, respectively, the output of the address generation circuit 8 is sent only to the buffer memory 10, and the output of the address generation circuit 9 is sent only to the buffer memory 11. When the instruction extracted into the instruction register 1 refers to the buffer memory 10, the selector 4 operates such that the address is calculated by the address generation circuit 8, and when the instruction refers to the buffer memory 11, the selector 4 operates such that the address is calculated by the address generation circuit 9. The same is true for the instruction applied to the instruction register 2. Another processor for attaining the above function is shown in FIG. 9, in which the instruction registers 1 and 2 are permanently correlated to the address generation circuits 8 and 9, respectively. The address of the instruction applied to the instruction register 1 is always calculated by the address generation circuit 8, and the address of the instruction applied to the instruction register 2 is always calculated by the address generation circuit 9. When the buffer memory 11 is to be referred to by the address calculated by the address generation circuit 8, the signal line 128 is selected by the selector 802 and the instruction is fetched. When the buffer memory 10 is to be referred to by the address calculated by the address generation circuit 9, the signal line 131 is selected by the selector 801, and the operand is fetched. The overall configuration of the processor is substantially the same as that of FIG. 1, and only the different functions are explained below.

Figure 10:
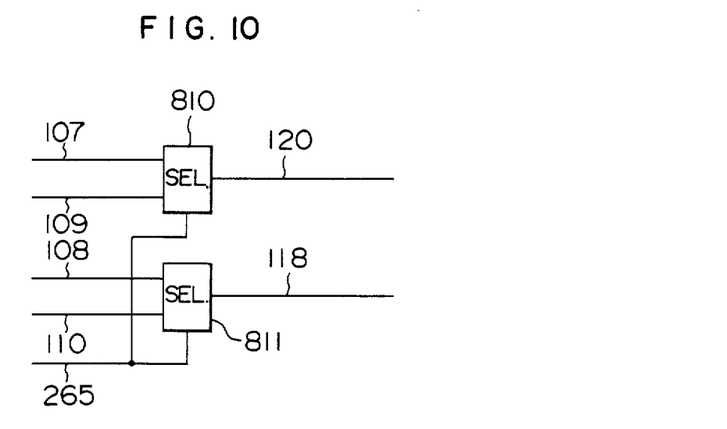
FIG. 10 shows in detail selector 800 of FIG. 9.
Figure 11:
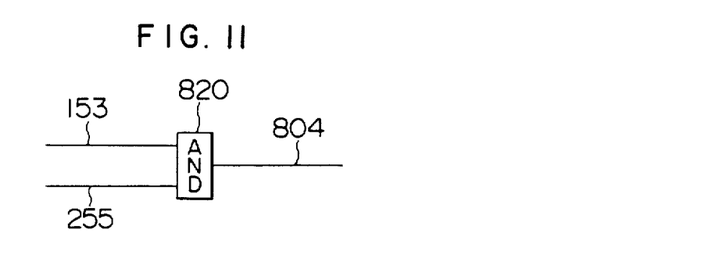
FIG. 11 shows in detail docode control circuit 803 of FIG. 9.

When a 6-byte length instruction is extracted into the instruction register 1, the selector 800 switches the address calculation of the first operand and the address calculation of the second operand. Details of the selector 800 are shown in FIG. 10. The input signal line 265 is same as that shown in FIG. 5. When the signal line 265 is set, the signal lines 109 and 110 are selected to calculate the address of the second operand. The signal line 265 is set only when the second operand of the 6-byte length instruction is to be operated. When the signal line 265 is not set, the signal lines 107 and 108 are selected. The selectors 801 and 802 select the addresses to be used for the memories. When the instruction in the instruction register 2 refers to the buffer memory 10, the signal line 264 is set, and the signal line 131 is selected by the selector 801. When the instruction in the instruction register 1 refers to the buffer memory 11, the signal line 804 is selected, and the signal line 128 is set by the selector 802. When the signal lines 264 and 804 are not set, the selector 801 selects the signal line 128, and the selector 802 selects the signal line 131. As shown in FIG. 5, when the first instruction does not refer to the buffer memory 10 and the second instruction refers to the buffer memory 10 and the second instruction is valid (the signal line 250 is set), the signal line 264 is set. As shown in FIG. 11, when the first instruction refers to the buffer memory 11 and the first instruction is valid (the signal line 153 is set), the signal line 804 is set.

As seen from the above description, the processor shown in FIG. 9 can decode the instructions in parallel depending on the combination of the instructions applied to the instruction registers 1 and 2 and refer to the buffer memories 10 and 11 in parallel. As a result, the same effect as that shown in FIG. 8 is attained.

In accordance with the present invention, two instructions can be extracted in parallel, and they can be decoded in parallel depending on the combination of the instruction. The fetching of the operand of the succeeding instruction and the fetching of the branch-to instruction of the branch instruction can be performed one cycle faster than in a case where decoding in parallel is not effected. As a result, the instruction execution time is shortened by one cycle, and the execution time of the succeeding instruction, which utilizes the result of the preceding instruction, and the execution time of the branch-to instruction are shortened.

We claim:

1. A pipelined data processor for executing in parallel an instruction of a kind other than a branch instruction and a branch instruction, said data processor comprising:
    main storage means;
    operation means for performing an operation in response to an instruction of a kind other than a branch instruction;

resource means responsive to a branch instruction for retrieving a branch-to instruction from said main storage means;

a pair of instruction registers;

set means for retrieving from said main storage means and storing in said pair of instruction registers a first instruction for execution by said data processor during the next cycle of operation thereof and a second instruction for execution by said data processor;

detection means for detecting whether the first and second instructions in said pair of instruction registers are an instruction of a kind other than a branch instruction and a branch instruction; and control means responsive to said detection means detecting that one of the first and second instructions is an instruction of a kind other than a branch instruction and the other of the first and second instructions is a branch instruction for controlling the execution of said one of the first and second instructions such that the operation requested by said one of the first and second instructions is executed in a plurality of stages, including a stage executed by said operation means, controlling the execution of said other of the first and second instructions such that the operation requested by said other of the first and second instructions is executed in a plurality of stages, including a stage executed by said resource means, said first and second instructions being executed in parallel, and controlling said set means to cause a third instruction and a fourth instruction to be retrieved from said main storage means and applied to said pair of instruction registers during the execution of said first and second instructions; said control means being responsive to said detection means failing to detect that one of the first and second instructions is an instruction of a kind other than a branch instruction and the other of the first and second instructions is a branch instruction for controlling the execution of said first instruction such that the operation requested by said first instruction is executed in a plurality of stages, including a stage executed by said operation means or said resource means, and controlling said set means to cause said second instruction and a third instruction to be stored in said pair of instruction registers during the execution of said first instruction.

2. A pipelined data processor for executing in parallel an instruction of a kind requesting an operation on an operand and another instruction of another kind, said data processor comprising:

main storage means, including first buffer memory means for storing an operand and second buffer memory means for storing an instruction;

operation means for peerforming an operation on an operand in said main storage means;

resource means responsive to an instruction of said another kind for performing another operation;

a pair of instruction registers;

set means for retrieving from said main storage means and storing in said pair of instruction registers a first instruction for execution by said data processor during the next cycle of operation thereof and a second instruction for execution by said data processor;

first and second address generation means connected to said first and second buffer memories, respectively, for generating respectively addresses for accessing said main storage means and addresses for accessing said first and second buffer memories;

a plurality of registers addressable by the instruction stored in said second buffer memory;

detection means for detecting whether the first and second instructions in said pair of instruction registers are an instruction of a kind requesting an operation on an operand and another instruction of another kind; and control means responsive to said detection means detecting that one of the first and second instructions is an instruction of a kind requesting operation on an operand and the other of the first and second instructions is an instruction of another kind for retrieving first data from one of the plurality of registers addressed by an instruction stored in said second buffer memory at an address location specified by said one of the first and second instructions, applying the first data to said first address generation means, retrieving second data from one of said plurality of registers addressed by an instruction stored in said second buffer memory at an address specified by said other of the first and second instructions, appplying the second data to said second address generation means, controlling the execution of said one of the first and second instructions such that the operation requested by said one of the first and second instruction is executed in a plurality of stages, including a stage retrieved from a memory location of said main storage means at an address accessed by said first address generating means and executed by said operation means on an operand retrieved from a memory location in said first buffer memory at an address accessed by said second address generation means, controlling execution of said other of the first and second instructions such that the operation requested by said other of the first and second instructions is executed in a plurality of stages, including a stage executed by said resource means, said first and second instructions being executed in parallel, and controlling said set means to cause a third instruction and a fourth instruction to be retrieved from said main storage means and applied to said pair of instruction registers during the execution of said first and second instructions; said control means being responsive to said detection means failing to detect that one of the first and second instructions is an instruction of a kind requesting operation on an operand and the other of the first and second instructions is an instruction of another kind for controlling the execution of said first instruction such that the operation requested by said first instruction is executed in a plurality of stages, including a stage executed by said operation means or said resource means, and controlling said set means to cause said second instruction and a third instruction to be stored in said pair of instruction registers during the execution of said first instruction.

3. A pipelined data processor for executing in parallel an instruction of a kind requesting an operation on an operand and another instruction of another kind, said data processor comprising:

main storage means, including a first buffer memory for storing an operand and a second buffer memory for storing an instruction;

operation means for performing an operation on an operand in said main storage means;

resource means responsive to an instruction of said another kind for performing another operation;

a pair of instruction registers;

set means for retrieving from said main storage means and storing in said pair of instruction registers a first instruction for execution by said data processor during the next cycle of operation thereof and a second instruction for execution by said data processor;

a plurality of registers connected to said pair of instruction registers for storing first data in one of the plurality of registers specified by said first instruction and storing second data in one of the plurality of registers specified by said second instruction;

first and second address generation means for receiving said first and second data, respectively, from said plurality of registers and generating addresses to access said main storage means;

detection means for detecting whether the first and second instructions in said pair of instruction registers are an instruction of a kind requesting an operation on an operand and another instruction of another kind; and control means responsive to said detecting means detecting that said first instruction being an instruction of a kind requesting an operation on an operand and said second instruction being an instruction of another kind for applying the addresses generated by said first and second address generation means to said first and second buffer memories, respectively, controlling the execution of said one of the first and second instructions such that the operation requested by said one of the first and second instructions is executed in a plurality of stages, including a stage executed by said operation means, on an operand retrieved from a memory location in said first buffer memory, at an address generated by said first address generation means, in accordance with instructions retrieved from a memory location in said second buffer memory at an address generated by said second address generating means, and controlling the operation of said other of the first and second instructions such that the operation requested by said other of the first and second instructions is executed in a plurality of stages, including a stage executed by said resource means; said first and second instructions being executed in parallel; said control means being responsive to said detecting means detecting that said second instruction being an instruction of a kind requesting an operation on an operand and said first instruction being an instruction of another kind for applying the addresses generated by said first and second address generation means to said second and said first buffer memories, respectively, controlling the execution of said one of the first and second instructions such that the operation requested by said one of the first and second instructions is executed in a plurality of stages, including a stage executed by said operation means, on an operand retrieved from a memory location in said first buffer memory at an address generated by said second address generation means, in accordance with instructions retrieved from a memory location in said second buffer memory at an address generated by said first address generation means, and controlling the operation of said other of the first and second instructions is executed in a plurality of stages, including a stage executed by said resource means, said first and second instructions being executed in parallel; and said control means being responsive to said detecting means failing to detect that one of the first and second instructions is an instruction of a kind requesting operation on an operand and the other of the first and second instructions is an instruction of another kind for controlling the execution of said first instruction such that the operation requested by said first instruction is executed in a plurality of stages, including a stage executed by said operation means or said resource means, and controlling said set means to cause said second instruction and a third instruction to be stored in said pair of instruction registers during the execution of said first instruction.

* * * * *